United States Patent [19]

Liedholz

[11] 3,927,317

[45] *Dec. 16, 1975

[54] BLANK VALUE STORING PHOTOMETER CIRCUITRY

[75] Inventor: Gerhard A. Liedholz, Miami, Fla.

[73] Assignee: Coulter Electronics, Inc., Hialeah, Fla.

[ * ] Notice: The portion of the term of this patent subsequent to Aug. 14, 1990, has been disclaimed.

[22] Filed: June 29, 1973

[21] Appl. No.: 374,874

Related U.S. Application Data

[63] Continuation of Ser. No. 242,049, April 7, 1972, Pat. No. 3,752,995.

[52] U.S. Cl. ............. 250/214 R; 250/565; 356/205; 307/117
[51] Int. Cl.² .......................................... H01J 39/12
[58] Field of Search........ 250/206, 214 R, 564, 565, 250/573, 574; 356/179, 205; 324/111; 307/311, 117, 235

[56] References Cited
UNITED STATES PATENTS

| | | | |
|---|---|---|---|
| 3,353,033 | 11/1967 | Gilbert | 328/147 X |
| 3,548,206 | 12/1970 | Ogle et al. | 307/231 |
| 3,566,133 | 2/1971 | Dorman, Jr. et al. | 250/214 R |
| 3,622,795 | 11/1971 | Dorman, Jr. | 250/576 |
| 3,632,209 | 1/1972 | Kingman | 356/205 X |
| 3,703,336 | 11/1972 | Rosse et al. | 250/565 |

*Primary Examiner*—Walter Stolwein
*Attorney, Agent, or Firm*—Silverman & Cass, Ltd.

[57] ABSTRACT

Circuitry which permits an externally supplied blanking solution, such as a serum blank, to be electronically stored for a long period of time, during which a calibration control solution and then a sequence of samples are applied to the photometer for calibration of the photometer and measurement of the sample in a logarithmic rundown mode. Specific subcircuits enhance the storing, calibrating and measuring operations.

15 Claims, 1 Drawing Figure

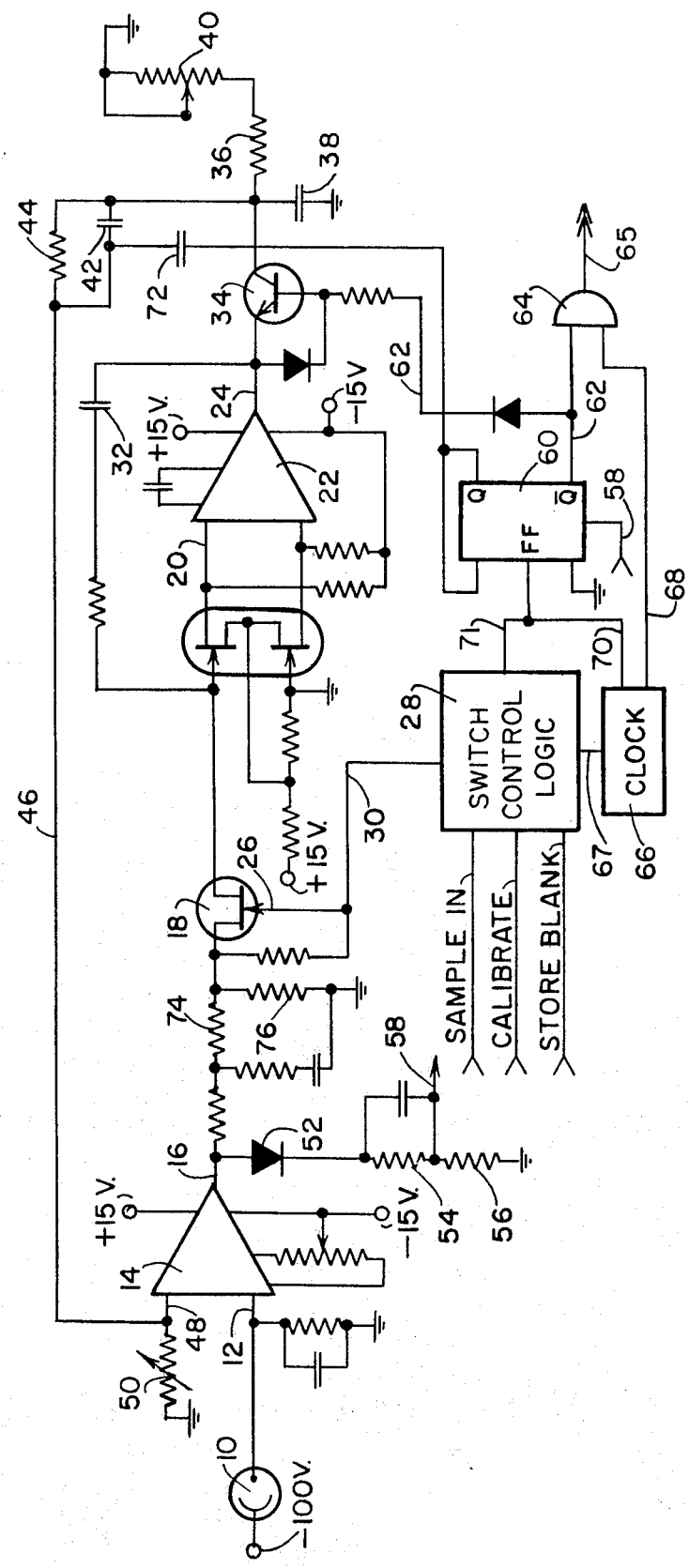

BLANK VALUE STORING PHOTOMETER CIRCUITRY

This application is a continuation of Ser. No. 242,049, filed on Apr. 7, 1972, now U.S. Pat. No. 3,752,995.

CROSS REFERENCE TO RELATED PATENTS

U.S. Pat. No. 3,566,133 teaches voltage storage and rundown circuitry for use in photometric analysis. U.S. Pat. No. 3,622,795 teaches a flow-through fluid test system for measuring the absorbance of a sequence of test samples, as related to a reference liquid which is introduced sequentially, alternately with the test samples.

To the extent that it might become necessary, the two above cited patents may be incorporated by reference herein. These patents are assigned to the assignee of this application.

BACKGROUND OF THE INVENTION

This invention generally relates to photometric measurement of liquid samples by their light absorbance. More specifically, this invention relates to photometric circuitry in which a voltage representative of a reference value is electrically stored momentarily and then discharged down (rundown) to a voltage value having a predetermined value, representative of a sample, against which the reference is being compared. One form of such rundown photometer is the subject of the cited U.S. Pat. No. 3,566,133. The time duration of the voltage rundown is calibrated to provide a readout of the absorbance of the sample or any physical or chemical property of the sample which is relatable to light transmittance.

According to U.S. Pat. No. 3,566,133, the reference standard is a liquid of known transmittance. Just prior to the introduction and measurement of each sample, a quantity of the reference liquid is fed into the apparatus and its transmittance measured to define the reference or standard voltage value. Accordingly, a quantity of the standard approximately equal to the total volume of the sequence of samples is required, and thus a limited quantity of a standard liquid would pose a significant problem to the apparatus according to U.S. Pat. No. 3,566,133.

If the apparatus could be provided with an internally stored standard value, the standard liquid could be eliminated. However, in various forms of photometric analysis a fixed reference is not convenient, or even possible. For example, in enzyme analysis, the reference liquid, normally called the blanking solution, is not a fixed standard and has a transmittance which not only is different from 100 percent T, but differs from supply lot to supply lot and can only be provided in small quantities. Essentially, such a blanking solution has an unknown transmittance.

Because of the limitations imposed by the blanking solution, a photometric apparatus requires an initial calibration adjustment for each blanking solution. To accomplish such calibration, it is common practice for a calibration control solution of known photometric response to be provided for calibration of the apparatus. Nevertheless, the calibration is not an easy or precise operation and is subject to numerous environmental variations which tend to decrease the measuring accuracies. Moreover, circuitry inherently introduces variables due to component aging, powerline fluctuations, amplifier drifting, voltage offsets, over sensitivity and low sensitivity to certain circuit conditions, etc.

The testing of a sequence of liquid samples can present liquid dispensing, handling, measuring and disposing problems. If the photometer is of the flow-through type, the vessels, cuvettes, tubing, etc. require filling, rinsing, draining, refilling, etc., all in timed relationships with respect to volumetric measurements and photometric measurements. The cited U.S. Pat. No. 3,622,795 teaches a flow-through photometer which provides a relatively simple, yet complete fluid handling system in which an automatically supplied rinse liquid, having a known transmittance, also was employed as the blanking solution. According to the teaching of that patent, the measurement of hemoglobin in a treated blood sample is accomplished by the manual pouring of a sequence of the samples into the cuvette alternately with the automatic dispensing of the blanking solution. However, since analyses, such as of enzymes, employ blanking solutions of unknown absorbance, with calibration control solutions and samples, the teachings in U.S. Pat. No. 3,622,795 are not sufficient, even though the basic equipment can provide more than a starting point.

SUMMARY OF THE INVENTION

This invention provides electric circuitry for an improved photometer, which reduces the aforementioned problems by storing for long periods of time the voltage value of a blanking solution, which is employed initially with a calibration control solution for calibration of the photometer and then is employed for comparative, voltage rundown measurements of a sequence of samples. The blank storage, calibration, and voltage rundown comparison is accomplished by a pair of amplifiers series connected with a pair of switches at their respective outputs and an R-C network. The switched output of the second amplifier is applied to the R-C network as well as being feedback to the input of the first amplifier. In the blank store, the calibration, and the sample measuring operations, the just mentioned circuit members coact in three different modes based upon the command of control logic. Voltage dividers, capacitive compensators and other unique design features provide an especially accurate, yet easily operated system. The fluid handling equipment of the cited U.S. Pat. No. 3,622,795 is employed in a modified form.

BRIEF DESCRIPTION OF THE FIGURE

The single FIGURE is a schematic diagram of the primary portions of the subject invention.

DESCRIPTION OF THE PREFERRED EMBODIMENT

With reference to the left end of the schematic, a photoresponsive element 10 is shown having its output coupled to the lower input 12 of a first operational amplifier 14. The output 16 of the first amplifier 14 is coupled by way of a first switch 18, an f.e.t., to the upper input 20 of a second operational amplifier 22, having an output 24. The gate 26 of the f.e.t. switch 18 is controlled by multi-input logic, illustrated simply as a switch control logic block 28. The output 30 of the logic block 28 is connected to the gate 26.

A blanking solution storage capacitor 32 is connected to the output 24 and, during the blank storage mode of the apparatus, will be charged through the amplifier 22 to a voltage representative of the absorbance of the blanking solution. Thereafter, during both the calibration and sample measuring modes of operation, the operational amplifier 22 with the capacitor 32 become a voltage storage circuit which holds the value of the blanking solution for as long as desired. During the charging of the capacitor 32, the switch 18 is closed, thereafter it is open for the duration of the calibration and sample testing.

Also connected to the output 24 of the amplifier 22 is a second switch 34, a transistor, having its collector connected to the voltage rundown R-C circuit 36, 38. In series with the resistor 36 is a variable calibrating resistor 40, used for system calibration during the calibration mode. Also connected to the collector of the switch 34 is a parallel R-C arrangement 42, 44, the operation of which will be detailed subsequently.

A coupling line 46 couples the R-C arrangement 42, 44 back to the upper input 48 of the first operational amplifier 14. A resistor 50 also is connected to the upper input terminal 48 and forms a voltage divider with the resistor 44. These two resistors would have large values such as ten megohms each. If they are equal, the rundown signal R-C value from 36, 38 would be $V_{RC}/2$ and such derived value of the stored blanking solution would be compared by the operational amplifier 14, during the calibration and sample measuring modes, with the respective photo-voltage at the lower input terminal 12. Each time that the rundown voltage crosses the then being applied photometric value at the input 12, the saturation state of the operational amplifier 14 swings from negative to positive and its output at 16 forward biases a diode 52 to produce a trigger or reset pulse. Such reset pulse is applied to dividing resistors 54 and 56 and then is coupled by a reset line 58 to the reset input of a flip-flop 60.

The $\overline{Q}$ output of the flip-flop 60 provides, on a line 62, the primary control to the second switch 34. The $\overline{Q}$ output also controls an output gate 64 from which appears at the output 65 of the apparatus a train of clock pulses, the number of which are a measure of the R-C rundown time and hence the digitalized value of the photometric input. The clock pulses originate in a clock 66 having a control input 67 from the switch control logic and two different outputs 68 and 70, with the output 68 being connected to the gate 64 and independent of the control input 67, and the output 70 being coupled to the toggle input of the flip-flop. The latter output is employed only during the calibration mode, as will be later detailed, for rapidly opening and closing the second gate 34.

The switch control logic 28 has an output 71 which also feeds the toggle input, but only once during each sample measurement.

The Q output of the flip-flop 60 feeds into a capacitor 72 which is coupled to the capacitor 42 and in combination these capacitors form a compensation arrangement for the voltage rundown as it is being fed to the first operational amplifier 14. Such an amplifier normally does not have a good high frequency response; whereas, the starting "corner" of an R-C discharge require an infinite bandwidth. The capacitor 42 (having a value such as 33 pf) provides a high frequency response rise, and the capacitor 72 (having a value such as 1.1 pf) provides a high-frequency rich differentiated pulse from the flip-flop 60 so as to kick the voltage rundown on its way. In the absence of these compensating capacitors, photometric readings of from 0.005A to 0.012A produced no readout on the output 65, and significant (though decreasing) error for photometric measurements up to an input of 0.100A, which possesses a 2 percent error. However with the compensating capacitors, there is no error for inputs between 0.006A to 0.100A. Thus, this compensating arrangement permits a relatively fast logarithmic rundown with high accuracy.

The dividing resistors 44 and 50 form another compensation arrangement, for minimizing circuit drift effects, aging of components, etc. By simply establishing the value of the resistor 50 (which can be a fixed value or a variable; hence the schematic showing of a variable resistor) to be slightly different than that of the resistor 44, there will develop a compensation adjustment. Such compensation is far simpler and less costly than any attempt to employ circuits having low drift characteristics and negligible aging problems. Hence, drift is utilized, rather than minimized.

The two resistors 44 and 50 also provide compensation against loss of the stored blanking solution value. It has been noted that quantity of loss is independent of the total stored value and only dependent upon time. Such loss is proportionately reduced by developing as large a stored value as practical and then by the divider 44, 50, which are almost equal in value, reducing the loss or drift by one half.

The switch control logic 28 includes means to bias the f.e.t. switch 18 into the off or switch open condition by a −15V signal and the amplifier 14 has +15V and −15V inputs and will operate as a comparator that is saturated at ±14V. Accordingly, the switch could then close inadvertently and force the apparatus to lose the stored blanking solution value. To prevent this undesirable condition a voltage divider is provided by resistors 74 and 76 that are coupled between the output 16 of the amplifier 14 and the input side (source) of the switch 18. Although the blank storing mode loop gain is greatly reduced, a generally unacceptable condition, the −14V from the amplifier output is reduced to about −5V and the end result is desirable.

The broadest features of the invention will become emphasized from the following operational description, from which it will be noted that the two amplifiers 14 and 22 have multifunctions controlled by the two switches 18 and 34, and that three basic operating modes are defined, as next charted:

| MODE | AMPLIFIER 14 | SWITCH 18 | AMPLIFIER 22 | SWITCH 34 |
|---|---|---|---|---|
| Blank Store Calibration | Amplifier Comparator | Closed Open | Amplifier Storage Circuit | Closed Open & Close a Clock Rate |
| Sequential Sample Measuring | Comparator | Open | Storage Circuit | Open & Close once for each sample |

To simplify description and illustration, the photometer structure, with its cuvette, pumps, fluid control switches etc. all have been ignored and one can either assume their presence and proceed, or can refer to the cited U.S. Pat. No. 3,622,795 to obtain an example of such a physical arrangement.

To begin with, it is to be assumed that the circuitry is quiescent and not storing any values. First, a blanking solution of unknown absorbance is to be transduced by the photoresponsive element 10. This step is accompanied by an input to the switch control logic 28, such input being labeled STORE BLANK. The store blank signal can be initiated by a control button (not shown) on the front panel of the apparatus. As a result of the store blank signal, the switch 18 is closed so that the absorbance of the blanking solution is applied through the amplifier 14, which then is functioning as a high gain amplifier. At the same time, the switch 34 is in a biased closed position and the voltage rundown capacitor 38 charges to the blanking solution value $V_{RC}$, which is the analog of the current from the photoelement 10. The resulting signal to the upper terminal 48 forces the voltage between the terminals 12 and 48 to be zero and the blanking storage capacitor 32 is charged to a voltage analog $V_B$ which is compensated against a voltage drop across the switch 34.

Next, the apparatus is prepared for calibration by initiation of a CALIBRATE input to the switch control logic 28, which via the line 30, thereupon opens the switch 18 to prevent the loss of the charge on the capacitor 32, which causes the amplifier 22 and the capacitor 32 to become a storage circuit. By introducing a calibration solution for transducing by the photoelement 10, the input 12 takes on a value different from that being fed into the input 48 of the operational amplifier 14 and that device becomes a comparator.

The CALIBRATE input also, by the control line 67, turns on the output 70 of clock 66 and causes a train (such as 5HZ) of pulses to be applied to the toggle input of the flip-flop 60. Each such clock pulse causes the $\overline{Q}$ output to go low and open the switch 34 to start the voltage rundown from the R-C 36, 38. As soon as the rundown reaches the point where the signal level on the comparator input 48 about equals that of the calibration input level on the input terminal 12, the comparator output 16 changes state and applies a reset pulse on the reset input 58 of the flip-flop to cause $\overline{Q}$ to go high and close the switch 34. Such comparison operation repeats itself at the clock rate, until the calibrate mode is terminated.

During the time of the voltage rundown, i.e., when the switch is open as dictated by $\overline{Q}$ being low, the gate 64 is enabled and the clock output 68 is gated to the apparatus output 65. The digitalized output at 65 is then a value determined by the absorbance of the calibration solution. Since that value is already known, any deviation on the readout 65 can be corrected by careful adjustment of the calibration resistor 40 until the readout is corrected. Since the blanking value is stored and the comparison with the calibration solution is being readout continuously (5HZ) in the calibration mode, the calibration procedure easily is accomplished.

Since the clock output 68 (such as a 10KHZ signal) is not controlled, it can be a unit separate from the clock which produces the output 70, a single "black box" is merely for illustration. Likewise, the switch control logic 28 can be several separate control circuits, not having any common junction or single control area.

All that remains is the actual measurements of each of a sequence of samples which are separately transduced by the photoelement 10 and compared by the comparator 14 in the same voltage rundown mode as the calibration solution. At the initiation of the sample measuring mode, a SAMPLE IN signal is applied to the switch control logic, which then disables the clock output 70 and enables the line 71 to the toggle input once for each test sample. One way for facilitating the SAMPLE IN signal would be by use of the arrangement of cited U.S. Pat. No. 3,622,795 wherein the opening and closing of the lid over the cuvette mouth initiated various functions. Each separate digitalized readout is generated and applied to the output 65.

It will be recognized that between the blanking solution and the calibration solution as well as before and after each sample, the cuvette should be rinsed or otherwise cleaned, such as by an air flush. Though not illustrated, the switch control logic provides for these non-comparing periods and inhibits any loss of the stored blank and otherwise prevents any undesirable lapses in switch control. Also provided, but not illustrated is a system reset, for clearing the blanking store and thereby preparing for a new blanking solution and another calibration solution.

In summary, the effectively permanent storage of the value of the blanking solution permits a single introduction of a small amount of that solution, and thereby avoids the problem of a need for a significant quantity of blanking solution. Likewise, a single introduction of the calibration solution, followed by its comparison with the stored blanking value and the calibration readout and adjustment period, simplifies calibration, and permits increased accuracy, all with only one introduction of the calibration solution. The improved voltage rundown operation, with the capacitive compensation; the use of multi-function operational amplifiers and controlled switches, the first switch being "protected" by a signal attenuating divider; and a drift utilizing divider for drift compensation all operate to provide an improved photometric apparatus.

Although the control circuits have been presented in block logic, and additional controls may well be desired to accomplish certain goals, it is believed well within the skill in the art to implement the desired control circuits. Of course, variations and modifications of the herein described embodiment are believed to be encompassed within its teachings and the scope of this invention.

What is sought to be protected by United States letters patent is:

1. Blank storing photometer circuitry comprising: first and second multi-function amplifiers having inputs and outputs, a first switch coupling the output of said first amplifier to an input of said second amplifier, voltage rundown circuit means, a second switch coupling the output of said second amplifier to said rundown circuit means, blank value storing means coupled to said second amplifier, a path coupling said rundown circuit means to one input of said first amplifier, a second input of said first amplifier connected to receive photometrically transduced signals, and control circuits for controlling the operation of said first and second switches and thereby defining three operating modes as well as generating a measurement of the photometrically transduced signals based upon their voltage rundown, said three operating modes being: a blank storage mode during which both said amplifiers act as amplifiers, both said switches are in a first stage and said blank storing means stores the blank value; a calibration mode during which said first amplifier acts as a comparator between the stored blank value and a then being applied calibration value to which the blank value is being rundown, the second amplifier and blank storing means coact to define a blank storage circuit, and said switches are in a second state; and a sample measuring mode which is substantially the same as said calibration mode, except that the comparison is between the stored blank value and one of a plurality of sample values then being applied.

2. Blank storing photometer circuitry according to claim 1 in which said switch control circuits include a generator of a train of pulses for periodically opening said second switch to commence the rundown to the calibration value, and said control circuits further include means coupled to the output of said first amplifier responsive to its comparator operation for closing said second switch at the time when the rundown provides an equality comparison, the next following pulse of the generated train then opening the second switch, whereby a sequence of calibration value measurements are attained.

3. Blank storing photometer circuitry according to claim 2 in which said rundown circuit means comprises an R-C circuit, which is provided with an adjustment means for use during said calibration value measurements.

4. Blank storing photometer circuitry according to claim 1 in which compensating means for increasing the accurate responsiveness of said first amplifier to the beginning of the voltage rundown are coupled to said path.

5. Blank storing photometer circuitry according to claim 4 in which said compensating means includes capacitive means for providing a high frequency response improvement to said first amplifier.

6. Blank storing photometer circuitry according to claim 4 in which said compensating means includes pulse means for producing a high-frequency rich pulse at the beginning of each rundown.

7. Blank storing photometer circuitry according to claim 6 in which said pulse means includes a capacitor which receives a trigger pulse from said switch control circuits at the beginning of each rundown.

8. Blank storing photometer circuitry according to claim 1 including signal attenuating means coupled between the output of said first amplifier and said first switch for preventing inadvertent switching action of said first switch during the comparator operation of said first amplifier.

9. Blank storing photometer circuitry according to claim 8 in which said attenuating means comprises a voltage divider.

10. Blank storing photometer circuitry according to claim 1 in which drift compensating means is connected to said one input of said first amplifier, said drift compensating means being constructed and connected to utilize existing drift in its compensating action.

11. Blank storing photometer circuitry according to claim 10 in which said drift compensating means comprises a voltage divider, at least part of which is connected into said path.

12. Blank storing photometer circuitry according to claim 11 in which said voltage divider is of the resistive type having two legs of slightly different resistance.

13. Blank storing photometer circuitry according to claim 1 in which said switch control circuits include switch control logic having inputs separately responsive to said three operating modes, a first output coupled to said first switch and a second output coupled to said second switch.

14. Blank storing photometer circuitry according to claim 13 in which a flip-flop is interposed between said second output and said second switch, and a clock is provided which has one output controlled by said switch control logic to feed into said flip-flop during the calibration mode.

15. Blank storing photometer circuitry according to claim 14 in which said clock has another output which is not controlled by said switch control logic and a gate is provided with one input from said another output and a second input from said flip-flop, such second input enabling said gate during voltage rundown, whereby the number of gated clock pulses is a digitalized measure of the transduced signals received by said first amplifier.

* * * * *